(12) United States Patent
Hoff, Jr.

(10) Patent No.: US 7,430,858 B2
(45) Date of Patent: Oct. 7, 2008

(54) SYSTEM TO GENERATE INERT GAS FROM EXHAUST GAS

(76) Inventor: Robert A. Hoff, Jr., 12122 Maple Rock, Houston, TX (US) 77077

( * ) Notice: Subject to any disclaimer, the term of this patent is extended or adjusted under 35 U.S.C. 154(b) by 0 days.

(21) Appl. No.: 11/330,019

(22) Filed: Jan. 11, 2006

(65) Prior Publication Data

US 2007/0157605 A1    Jul. 12, 2007

(51) Int. Cl.
*F01N 3/02* (2006.01)
(52) U.S. Cl. ............... 60/309; 60/297; 60/311; 60/320
(58) Field of Classification Search ............ 60/309, 60/315, 316, 320, 297, 299, 311
See application file for complete search history.

(56) References Cited

U.S. PATENT DOCUMENTS

| | | | | |
|---|---|---|---|---|
| 3,389,972 A * | 6/1968 | Pottharst, Jr. ............. | 422/62 |
| 3,464,801 A * | 9/1969 | Barstow ............... | 422/111 |
| 3,579,308 A * | 5/1971 | Gower ............... | 422/112 |
| 3,725,012 A * | 4/1973 | Gower ............... | 422/62 |
| 3,808,805 A * | 5/1974 | Miramontes ............. | 60/274 |
| 4,276,057 A * | 6/1981 | Becker et al. ............ | 95/174 |
| 4,656,831 A * | 4/1987 | Budininkas et al. ........ | 60/297 |
| 4,725,359 A * | 2/1988 | Ray ................... | 210/640 |
| 5,456,064 A | 10/1995 | Graves ................ | 60/276 |
| 6,581,375 B2 * | 6/2003 | Jagtoyen et al. .......... | 60/309 |
| 6,823,660 B2 | 11/2004 | Minami ............... | 60/280 |
| 6,893,615 B1 * | 5/2005 | Alexander ............. | 422/177 |
| 7,000,409 B2 * | 2/2006 | Mazzetti .............. | 62/93 |
| 2002/0028168 A1 | 3/2002 | Giacobbe ............. | 423/212 |
| 2007/0006571 A1 * | 1/2007 | Vetrovec ............. | 60/281 |

* cited by examiner

*Primary Examiner*—Thomas Denion
*Assistant Examiner*—Diem Tran
(74) *Attorney, Agent, or Firm*—Buskop Law Group, PC; Wendy Buskop

(57) ABSTRACT

An inert gas production and compression system for extracting and compressing an inert gas from an exhaust gas of an engine includes a power and inert gas generator, an inert gas processing system, and an inert gas compressor. The inert gas processing system includes an extraction system to receive exhaust gas from an engine and to remove liquids and particulate from the exhaust gas; a cooling system to receive the exhaust gas from the engine and at each stage of a multi-stage gas compressor; and a separator for separating liquids and particulate from the exhaust gas. The inert gas production and compression system can include one or more controllers and a microprocessor system to monitor the operation of the inert gas processing system and to manage the inert gas processing system based on inputs from the controllers.

11 Claims, 2 Drawing Sheets

SYSTEM TO GENERATE INERT GAS FROM EXHAUST GAS

FIELD

The embodiments relate to systems of producing and compressing inert gas from exhaust gas utilizing a machine with a small footprint.

BACKGROUND

Inert gas generation and compression systems, which generate nitrogen gas streams or of primarily nitrogen gas stream in combination with other inert gases, such as carbon dioxide, are used in many different industrial applications. For example, an inert gas or an inert gas mixture can be used to prevent instantaneous combustion or explosive ignition, in limiting corrosion and oxidation (for example, as in inert gas blanketing), in semi-conductor manufacturing processes, or in specialized heat treating applications.

Inert gases can be used for inerting the ullage in large oil tanks or other types of containers employed to store or deliver combustible fluids. In these cases, an inert gas or an inert gas mixture is used to fill the head space in the tanks prior to filling or during off-loading of the tanks. This precaution is employed to prevent combustion or explosions within the tanks due to the initial presence or influx of air during the filling and/or emptying process.

Inert gases have been used to facilitate the removal of crude oil from semi-depleted oil wells. Injection of the inert gas into these wells causes some of the gas to dissolve within the residual oil reserves due to substantial overpressure created by the gas deep within the wells. The subsequent increase in reservoir pressure and/or reductions of well fluid column weight while flowing is capable of bringing large quantities of additional oil to the surface. In other cases, multiple inert gas injection sites, surrounding a centralized non-pressurized extraction site, may be simultaneously pressurized with an inert gas or mixture of inert gases. In this scenario, circumferential gas pressure alone will tend to force residual quantities of subsurface oil to flow to the surface region of a well through the centralized non-pressurized extraction site.

In order for a gas to be used as an inert gas in applications where the prevention of combustion and/or oxidation is critical, the oxygen content in the inert gas must be sufficiently reduced to a level that will not sustain fire or explosion. For example, inert gases having oxygen contents of less than about 2.0 percent by volume are preferred for inerting the head space in oil tankers.

High purity, cryogenic grade liquid nitrogen, which can be vaporized to produce high purity gaseous nitrogen, is usually about 99.99 percent pure (at least). This grade of nitrogen is typically employed in various inerting processes, including some of the applications already mentioned herein.

Cryogenic grade liquid nitrogen is generally made in large air separation plants, transported in the liquid state to a point of use location, and employed either directly as a liquid or as a gas after vaporization. Argon is another type of inert gas which is produced and employed similarly. The generation, transportation, and vaporizing of high purity cryogenic grade inert gases is very costly.

Therefore, a need exists for a system to efficiently produce inert gases with simple on-site systems and thus avoid the production and transportation costs associated with delivery to point of use locations.

One way to generate inert gases through onsite production involves employing conventional membrane systems to produce gaseous nitrogen from air. These kinds of systems typically produce gaseous nitrogen onsite with purity levels on the order of about 90 to 93 percent by volume. However, these systems are quite expensive due to high energy requirements and achieve relatively low nitrogen gas flow rates at high purity production levels.

An alternative way to produce an inert gas stream is through the combustion of an organic fuel. For example, the product gas stream produced as a result of any combustion process involving the burning of gasoline, diesel fuel, or natural gas in the air generally contains high levels of nitrogen, some carbon dioxide, and small amounts of oxygen, carbon monoxide, and water vapor.

The carbon dioxide and water vapor impurities are relatively inert, thus are not objectionable in many subsequent uses of the inert gas. For most applications, the oxygen level is low enough at process discharge to be used as an inert gas. If necessary, water vapor can be removed (typically, by two phase separators, adsorption, or by a membrane permeation technique).

A need exists to efficiently produce inert gases with simple on-site systems, thus avoiding high product costs and transportation costs associated with delivery to point of use locations.

A need exists to reduce the high costs associated using current on-site systems to generate inert gases due to high energy requirements and high investment costs, and to achieve higher nitrogen gas flow rates at high purity production levels without compromising safety concerns.

The embodiments meet these needs.

BRIEF DESCRIPTION OF THE DRAWINGS

The detailed description will be better understood in conjunction with the accompanying drawings as follows.

Figure 1:
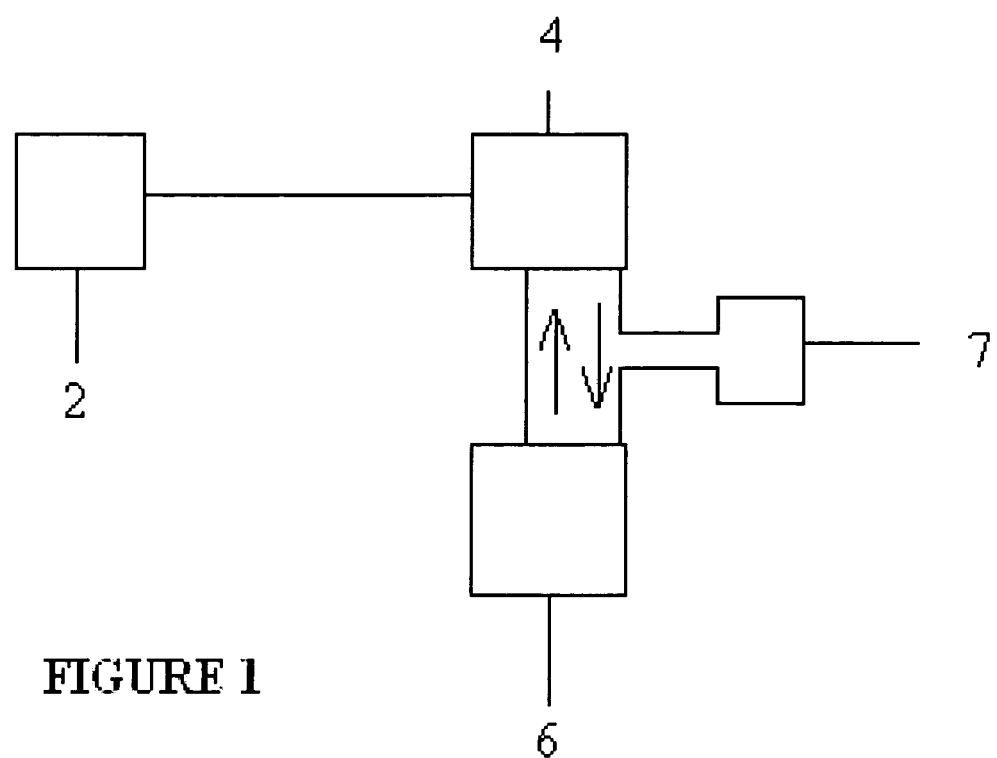
FIG. 1 depicts an overall diagram of an embodiment of an inert gas production and compression system.

The embodiments are detailed below with reference to the listed Figures.

DETAILED DESCRIPTION OF THE EMBODIMENTS

Before explaining the embodiments in detail, it is to be understood that the embodiments are not limited to the particular embodiments and that they can be practiced or carried out in various ways.

The embodiments relate to inert gas production and compression systems. The embodied systems utilize a smaller footprint, thereby saving valuable space on platforms and in refineries. The systems weigh less than comparable systems. The use of a smaller footprint and the lower weight of the systems provide a reduction in transportation costs and conserves valuable energy resources.

The systems are easier to operate given that the systems require a fewer number of stages to monitor and use. The systems have a faster start-up procedure than comparable systems. The fewer number of stages, and the ease and the efficiency of the start-up procedure provide for lower operating costs and less logistic support than current inert gas pumps.

Since the embodied systems do not use liquid nitrogen, the embodiments do not have the hazard of liquid nitrogen spills, thereby lowering the risk of harm to personnel. The systems provide for lowered risk of oxygen starvation for personnel dues to nitrogen displacement of oxygen in a closed environment.

The embodied inert gas production and compression systems include a power and inert gas generator, an inert gas processing system, and an inert gas compressor. The inert gas production systems utilize exhaust gas produced from combustion with gas or refined hydrocarbons in the engine. An example of a usable source of exhaust gas is exhaust gas from a diesel, oil, or gas driven internal combustion engine having an exhaust outlet, a fuel control valve, and an ignition advance/retard control. Another example is exhaust gas from a catalytic converter assembly of one or more catalytic converters.

The inert gas processing systems include an extraction system, a cooling system, and a separator. The embodied extraction systems can receive exhaust gas from the engine and remove liquids and particulate from the exhaust gas.

The embodied cooling systems can receive exhaust gas from an engine and at each stage of a multi-stage gas compressor. The embodied separator can separate liquids and particulates from the exhaust gas. The separator can include a safety device, such as a safety relief valve.

The inert gas compressor can be used to increase pressure of the exhaust gas for export from the inert gas production system. The inert gas compressor can be driven by the engine used in the inert gas processing system.

The embodied inert gas processing systems can include a plurality of controllers to monitor the operation of the inert gas processing system. The embodied inert gas processing systems can include a microprocessor system to manage the inert gas processing system based on inputs from the plurality of controllers. Examples of controllers used in the embodiments include engine speed controllers; liquid level maintenance controllers; emergency shut down controllers; inlet gas pressure controllers; export gas pressure controllers; export gas temperature controllers; and combinations thereof.

The embodied inert gas production and compression systems can include sensing means and an associated microprocessor to maintain flow of the exhaust within safe operation parameters. The sensing means can be sensors that monitor physical characteristics of the system and fluids, both gas and liquid. The sensing means can measure the operating physical characteristics as well as monitor for low and high conditions in order to being a shutdown process. For example, the sensing means can be adapted to maintain the exhaust gas temperature within a predetermined temperature region. In another example, a temperature sensor can be used to aid the sensing means. In yet another example, an oxygen sensor can be used to monitor export gas oxygen content.

With reference to the figures, FIG. 1 depicts an overall diagram of an embodiment of an inert gas production and compression systems. The depicted embodiment includes a power and gas generator (2) in communication with an inert gas processing system (4) in communication with a compression system (6). An example of a power and gas generator is a Caterpillar 3406 available from Caterpillar, Inc. of Peoria, Ill. The treated inert gas is exported via an outlet valve (7).

Figure 2:
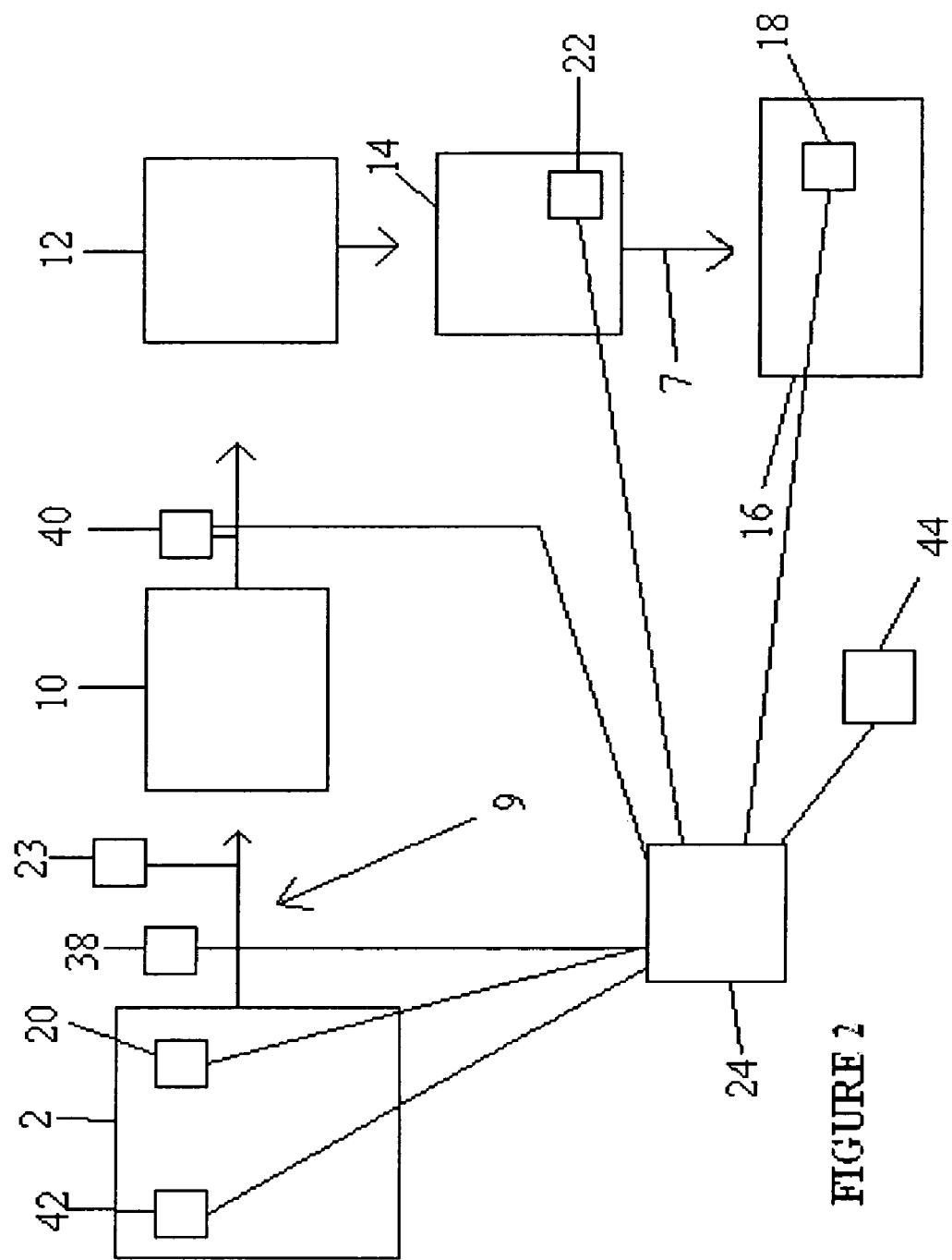
FIG. 2 depicts a diagram of the flow path of an embodiment of an inert gas processing system.

FIG. 2 depicts a diagram of the flow path of an embodiment of an inert gas processing system. In the depicted embodiment, the inert gas processing system receives exhaust gas (9) from the power and inert gas generator (2). The power and inert gas generator (2) then clarifies, separates, cools, and conditions the exhaust gases. The exhaust gases are passed to a catalyst and particulate trap (10). An example catalyst and particulate trap is a base metal coated particulate filter from Haldor Topsoe or a CDPF from Johnson Matthey.

The catalyst and particulate trap (10) sends the gasses to a cooling system (12), such as an Air-X-changer fin/fan cooler. The flow rate for the gasses can be from about 20 standard cubic feet per minute to more than 2000 standard cubic feet per minute.

The cooled exhaust gases flow from the cooling system (12) to the separator (14) in order to remove liquids, such as water and condensate. An example separator is a model Whirlyscrub V from Natco of Houston, Tex. Other separators can operate within the scope of the embodiments. Other vessels, such as coalescing filters and filter separators, can be used within the scope of the embodied systems. Examples cooling systems (12) include horizontal, multistage, fan forced air fin assemblies (such as, a model F from Air-X-changers in Tulsa, Okla.) and water cooled heat exchangers.

Continuing with FIG. 2, from the separator (14), the conditioned gases flow into a single stage compressor (16) or a multi stage positive displacement compressor. The treated inert gas is then exported via an outlet valve (7). An example of a single stage compressor is Model SSM available from Gardner Denver located in Quincy, Ill. Rotary compressors or screw compressors can be used; however, for very high pressures of over 300 psi and above, positive displacement compressors should be used. An example of a multistage positive displacement compressor is a model JGA/4 from Ariel of Mt. Vernon, Ohio.

For the multi stage positive displacement compressor, the exhaust gas can be treated after each stage of the compressor process. The gasses are returned from each stage of the multistage compressor to the cooling system (12) and then through the separator (14). The gasses then flow to the subsequent stage of the compressor.

A controller (18) can be used as a control and monitoring system for the compressor (16). The controller (18) can be used as an emergency shut down system.

The power and inert gas generator (2) can have a controller (20) for controlling the speed or the rpms of the power and inert gas generator (2). As an example, a controller (22) can be located on the separator (14) and used as a liquid level maintenance controller. An example of a liquid level maintenance controller is Model 1001a controller available from Norriseal of Houston, Tex. Further, a controller (23) can be used for setting the inlet gas pressure between the power and inert gas generator (2) and the catalyst and particulate trap (10).

A microprocessor system (24) can be used to communicate and/or operate all controllers (18, 20, 22 and 23). An example of a usable microprocessor system is the "IDEA"™ system available from Production Testing Services of Houston, Tex., wherein the microprocessor system (24) is disposed on any commercially available computer system.

A safety device, such as a series 900 safety pressure valve form Anderson Greenwood of Houston, Tex., can be used on the separator (14) to protect against over pressurization. Temperature and pressure sensors (38, 40, 42 and 44) can be used throughout the embodied inert gas production and compression systems. The temperature and pressure sensors (38, 40, 42 and 44) can be in communication with the microprocessor (24) and respective components.

While these embodiments have been described with emphasis on the embodiments, it should be understood that within the scope of the appended claims, the embodiments might be practiced other than as specifically described herein.

What is claimed is:

1. An inert gas production and compression system, comprising:

a. a power and inert gas generator adapted to operate on diesel, oil, gas, and combinations thereof;

b. an inert gas processing system comprising:
  i. an extraction system to receive exhaust gas from the power and inert gas generator; wherein the extraction system comprises:
    (a). a catalyst and particulate trap for receiving gas from the power and inert gas generator for removing a primary portion of particulates and unburned hydrocarbons and oxygen forming cleaned inert gas;
  ii. a cooling system to receive and cool the cleaned inert gas from the catalyst and particulate trap forming cooled inert gas; and
  iii. a separator for separating and removing liquids and a secondary portion of particulate from the cooled inert gas; and
c. an inert gas compressor for receiving the cooled inert gas and receiving power from the power and inert gas generator; and
d. a liquid level maintenance controller located on the separator for controlling liquid level in the separator, a pressure controller for setting the inlet gas pressure between the power inert gas generator, the catalyst, and particulate trap, a power and inert gas generator controller to control at least one of the speed or revolution per minute of the power and inert gas generator, and a emergency shut down controller, wherein the emergency shut down controller controls and monitors the compressor, and a microprocessor system to at least one of communicate and operate each controller.

2. The inert gas production and compression system of claim 1, further comprising a plurality of sensors to monitor operation of the inert gas processing system, wherein the plurality of sensors are in communication with the microprocessor system and the plurality of controllers.

3. The inert gas production system of claim 1, wherein the exhaust gas is produced from combustion with gas or refined hydrocarbons in the engine.

4. The inert gas production and compression system of claim 1, wherein the separator further comprises a safety device.

5. The inert gas production and compression system of claim 4, wherein the safety device is a safety relief valve.

6. The inert gas production system of claim 4, wherein the inert gas compressor increases pressure of the inert gas for export from the inert gas production and compression system.

7. The inert gas production system of claim 1, further comprising a sensing means and a second microprocessor connected to the sensing means to maintain flow of the exhaust gas within safe operation parameters.

8. The inert gas production system of claim 7, wherein the sensing means is adapted to maintain exhaust gas temperature within a predetermined temperature region.

9. The inert gas production system of claim 7, wherein the sensing means includes a temperature sensor.

10. The inert gas production system of claim 1, wherein the exhaust gas is from a diesel, an oil or a gas driven internal combustion engine having an exhaust outlet, a fuel control valve, and an ignition advance/retard control; and a catalytic converter assembly, a particulate trap, or combinations thereof.

11. The inert gas production system of claim 10, wherein the catalytic converter assembly comprises an inlet connected by a first conduit to an exhaust outlet of the oil or gas driven internal combustion engine.

* * * * *